(12) United States Patent
Cao (10) Patent No.: US 10,049,070 B2
(45) Date of Patent: Aug. 14, 2018

(54) DATA CARD, AND DATA CARD SWITCHING METHOD AND APPARATUS

(71) Applicant: Huawei Device Co., Ltd., Shenzhen (CN)

(72) Inventor: Zhiqiang Cao, Xi'an (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 215 days.

(21) Appl. No.: 14/959,321

(22) Filed: Dec. 4, 2015

(65) Prior Publication Data

US 2016/0085709 A1 Mar. 24, 2016

Related U.S. Application Data

(63) Continuation of application No. PCT/CN2014/079696, filed on Jun. 12, 2014.

(30) Foreign Application Priority Data

Jun. 20, 2013 (CN) .......................... 2013 1 0247219

(51) Int. Cl.
*H05K 7/10* (2006.01)
*G06F 13/40* (2006.01)
(Continued)

(52) U.S. Cl.
CPC ............ *G06F 13/4022* (2013.01); *G06F 8/65* (2013.01); *G06F 13/128* (2013.01);
(Continued)

(58) Field of Classification Search
CPC ............ G06F 13/4022; G06F 13/4286; G06F 13/4081; G06F 13/128; G06F 8/65; G06F 13/385; G06F 2213/3804
See application file for complete search history.

(56) References Cited

U.S. PATENT DOCUMENTS

2010/0180064 A1 7/2010 Han
2011/0022737 A1 1/2011 Kono et al.
(Continued)

FOREIGN PATENT DOCUMENTS

CN 101324876 A 12/2008
CN 102053852 A 5/2011
(Continued)

OTHER PUBLICATIONS

"Huawei HiLink modems" retrieved from https://mybroadband.co.za/vb/showthread.php/507680-Huawei-HiLink-modems-(E303-E3 . . . ; May 3, 2013.*
(Continued)

*Primary Examiner* — Jing-Yih Shyu
(74) *Attorney, Agent, or Firm* — Conley Rose, P.C.

(57) ABSTRACT

A data card switching method is provided. The method includes acquiring, by a data card switching apparatus, a port form flag of a data card; and sending, by the data card switching apparatus, the port form flag to the data card, such that the data card switches to a corresponding port form. Also, a data card and a data card switching apparatus are provided. A data card acquires a corresponding port form flag from a data card switching apparatus, and switches to a corresponding port form according to the port form flag, such that mode switching of the data card is performed without the need to upgrade data card software, thereby reducing maintenance costs of the data card.

13 Claims, 7 Drawing Sheets

(51) Int. Cl.
*G06F 13/38* (2006.01)
*G06F 8/65* (2018.01)
*G06F 13/12* (2006.01)
*G06F 13/42* (2006.01)

(52) U.S. Cl.
CPC ........ *G06F 13/385* (2013.01); *G06F 13/4081* (2013.01); *G06F 13/4286* (2013.01); *G06F 2213/3804* (2013.01)

(56) References Cited

U.S. PATENT DOCUMENTS

| | | | | |
|---|---|---|---|---|
| 2012/0102238 | A1* | 4/2012 | Wei | G06F 13/102 710/13 |
| 2012/0173861 | A1* | 7/2012 | Ou | G06F 9/4408 713/2 |
| 2013/0031351 | A1* | 1/2013 | Mao | G06K 19/0722 713/100 |
| 2014/0129727 | A1* | 5/2014 | Wei | H04W 8/265 709/228 |
| 2014/0241206 | A1* | 8/2014 | Wang | H04W 4/18 370/254 |

FOREIGN PATENT DOCUMENTS

| | | | |
|---|---|---|---|
| CN | 102096646 | A | 6/2011 |
| CN | 102103555 | A | 6/2011 |
| CN | 102222207 | A | 10/2011 |
| CN | 102521171 | A * | 6/2012 |
| EP | 0717548 | A2 | 6/1996 |
| EP | 2320328 | A1 | 5/2011 |
| EP | 2472395 | A1 | 7/2012 |
| WO | 20110054227 | A1 | 5/2011 |

OTHER PUBLICATIONS

"E3131 modeswitch to CDC mode" retrieved from http://www.draisberghof.de/usb_modeswitch/bb/viewtopic.php?t=1295&p=8670; Jul. 12, 2013.*
Partial English Translation and Abstract of Chinese Patent Application No. CN102096646, Oct. 22, 2015, 6 pages.
Foreign Communication From a Counterpart Application, PCT Application No. PCT/CN2014/079696, English Translation of International Search Report dated Dec. 24, 2014, 2 pages.
Foreign Communication From a Counterpart Application, PCT Application No. PCT/CN2014/079696, English Translation of Written Opinion dated Sep. 24, 2014, 11 pages.
Foreign Communication From a Counterpart Application, Japanese Application No. 2016-513222, Japanese Office Action dated Sep. 20, 2016, 5 pages.
Foreign Communication From a Counterpart Application, Japanese Application No. 2016-513222, English Translation of Japanese Office Action dated Sep. 20, 2016, 6 pages.
Partial English Translation and Abstract of Chinese Patent Application No. CN102222207, Dec. 29, 2016, 8 pages.
Partial English Translation and Abstract of Chinese Patent Application No. CN102521171, Dec. 31, 2016, 10 pages.
"Huawei e3131 Hilink Ubuntu 12.10," Oct. 26, 2012, 4 pages.
Foreign Communication From a Counterpart Application, Chinese Application No. 201310247219.7, Chinese Office Action dated Nov. 30, 2016, 16 pages.
Partial English Translation and Abstract of European Patent Application No. WO2011054227, Part 1, Apr. 26, 2016, 6 pages.
Partial English Translation and Abstract of European Patent Application No. WO2011054227, Part 2, Apr. 26, 2016, 3 pages.
"Huawei HiLink modems (E303, E3131, etc.)," XP055256427, Retrieved from the Internet: URL:http://mybroadband.co.za/vb/showthread.php/507680-Huawei-HiLink-modems-(E303-E313-etc-)/page2, [retrieved on Mar. 8, 2016], Apr. 26, 2013, 7 pages.
Foreign Communication From a Counterpart Application, European Application No. 14812949.7, Extended European Search Report dated Mar. 31, 2016, 12 pages.
RCW, "Huawei E3131 on Wheezy" Oct. 2, 2012, 7 pages.
Foreign Communication From a Counterpart Application, Chinese Application No. 201310247219.7, Chinese Office Action dated Jul. 25, 2017, 10 pages.

* cited by examiner

DATA CARD, AND DATA CARD SWITCHING METHOD AND APPARATUS

CROSS-REFERENCE TO RELATED APPLICATIONS

This application is a continuation of International Application No. PCT/CN2014/079696, filed on Jun. 12, 2014, which claims priority to Chinese Patent Application No. 201310247219.7, filed on Jun. 20, 2013, both of which are hereby incorporated by reference in their entireties.

TECHNICAL FIELD

The present disclosure relates to the field of computers and communications technologies, and in particular, to a data card, and a data card switching method and an apparatus.

BACKGROUND

Figure 1:
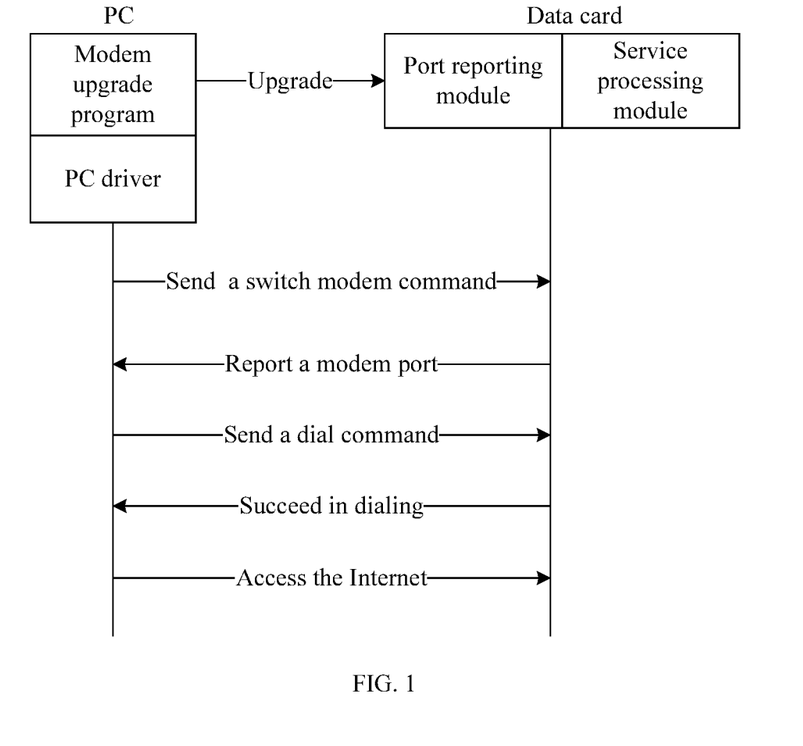
FIG. 1 is a schematic diagram in which a data card switches from a hilink port form to a modem port form in the prior art.
Figure 2:
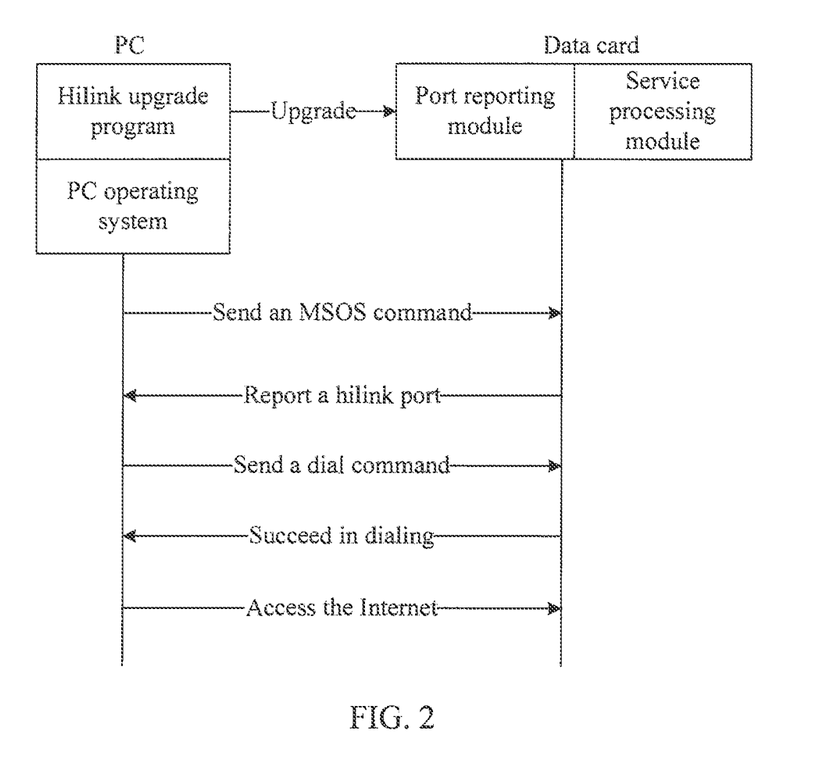
FIG. 2 is a schematic diagram in which a data card switches from a modem port form to a hilink port form in the prior art.

At present, a port form of a data card is generally fixed, and a port form of one data card may be only Remote Network Driver Interface Specification (RNDIS) or modem. If there is a need to switch to a different port form, data card software needs to be upgraded to satisfy the need. For example, to switch a data card from a modem form to a hilink form, an upgrade to a hilink data card is required; and to switch a data card from a hilink form to a modem form, an upgrade to a modem data card is required. FIG. 1 and FIG. 2 explain how switching is performed between the two forms. Firstly, a data card is inserted into a data card switching apparatus (which is generally a computer or a built-in device), and data card software in the data card switching apparatus is upgraded to implement data card switching. An upgrade to modem data card software switches a data card to a modem form, and an upgrade to hilink data card software switches a data card to a hilink form. In addition, each switching requires an upgrade to a corresponding form of data card software.

In the prior art, because mode switching of a data card can be performed only by upgrading data card software, for data cards that have already been sold, meeting user requirements for mode switching by upgrading data card software causes high maintenance costs.

SUMMARY

Embodiments of the present disclosure provide a data card and a data card switching method, so as to solve a problem of high maintenance costs in the prior art, which is caused by the need to upgrade data card software when data card switching is performed.

To solve the foregoing technical problem, the embodiments of the present disclosure disclose the following technical solutions.

According to a first aspect, a data card switching method is provided, including steps of acquiring, by a data card switching apparatus, a port form flag of a data card; and sending, by the data card switching apparatus, the port form flag to the data card, such that the data card switches to a corresponding port form.

In a first possible implementation manner of the first aspect, the step of acquiring, by a data card switching apparatus, a port form flag of a data card includes running, by the data card switching apparatus, a driver of a corresponding port form to obtain the port form flag.

In a second possible implementation manner of the first aspect, the step of sending, by the data card switching apparatus, the port form flag to the data card includes sending, by the data card switching apparatus, the port form flag to the data card after the data card is inserted into the data card switching apparatus or the data card is restarted.

In a third possible implementation manner of the first aspect, the step of acquiring, by a data card switching apparatus, a port form flag of a data card includes receiving, by the data card switching apparatus, the port form flag set by a user.

In a fourth possible implementation manner of the first aspect, the step of sending, by the data card switching apparatus, the port form flag to the data card includes enabling an attention (AT) command port, and sending, using an AT command, the port form flag to the data card for storage, such that the data card reads the port form flag to implement switching.

In a fifth possible implementation manner of the first aspect, the step of acquiring, by a data card switching apparatus, a port form flag of a data card includes acquiring, by the data card switching apparatus according to a pre-integrated configuration that is related to a port form flag, the port form flag.

In a sixth possible implementation manner of the first aspect, the step of sending, by the data card switching apparatus, the port form flag to the data card includes when the data card is inserted into the data card switching apparatus, sending, by the data card switching apparatus according to an optical disc device mode reported by the data card, the port form flag to the data card using an optical disc driver.

In a seventh possible implementation manner of the first aspect, the port form flag includes at least a modem port form flag or a hilink port form flag, and the data card includes at least a modem port form and a hilink port form.

According to a second aspect, a data card switching method is provided, including steps of acquiring, by a data card, a port form flag from a data card switching apparatus; and switching, by the data card, to a corresponding port form according to the port form flag.

In a first possible implementation manner of the second aspect, the step of acquiring, by a data card, a port form flag from a data card switching apparatus includes, after the data card is inserted into the data card switching apparatus or the data card is restarted, receiving the port form flag sent by the data card switching apparatus, where the port form flag sent by the data card switching apparatus is obtained by running, on the data card switching apparatus, a driver of the corresponding port form.

In a second possible implementation manner of the second aspect, the step of acquiring, by a data card, a port form flag from a data card switching apparatus includes, after the data card is inserted into the data card switching apparatus or the data card is restarted, reading a port form flag stored in the data card, where when the data card is inserted into the data card switching apparatus, the port form flag stored in the data card is written to a memory of the data card by the data card switching apparatus by sending an AT command through an AT command port.

In a third possible implementation manner of the second aspect, the step of acquiring, by a data card, a port form flag from a data card switching apparatus includes, after the data card is inserted into the data card switching apparatus, reporting, by the data card, an optical disc device, always keeping an optical disc mode unchanged, and receiving, using the optical disc mode, an optical disc command that is sent by the data card switching apparatus and includes the port form flag.

In a fourth possible implementation manner of the second aspect, the port form flag includes at least a modem port form flag or a hilink port form flag, and the data card includes at least a modem port form and a hilink port form.

According to a third aspect, a data card switching apparatus is provided, including a port form acquiring unit configured to acquire a port form flag of a data card; and a port form sending unit configured to send the port form flag to the data card, such that the data card switches to a corresponding port form.

In a first possible implementation manner of the third aspect, the port form acquiring unit is configured to run a driver of a corresponding port form to obtain the port form flag.

In a second possible implementation manner of the third aspect, the port form sending unit is configured to send, after the data card is inserted into the data card switching apparatus or the data card is restarted, the port form flag to the data card.

In a third possible implementation manner of the third aspect, the port form acquiring unit is configured to receive the port form flag set by a user.

In a fourth possible implementation manner of the third aspect, the port form sending unit is configured to enable an AT command port, and send, using an AT command, the port form flag to the data card for storage, such that the data card reads the port form flag to implement switching.

In a fifth possible implementation manner of the third aspect, the port form acquiring unit is configured to acquire the port form flag according to a pre-integrated configuration that is related to a port form flag.

In a sixth possible implementation manner of the third aspect, the port form sending unit is configured to, when the data card is inserted into the data card switching apparatus, send, according to an optical disc device mode reported by the data card, the port form flag to the data card using an optical disc driver.

In a seventh possible implementation manner of the third aspect, the port form flag includes at least a modem port form flag or a hilink port form flag, and the data card includes at least a modem port form and a hilink port form.

According to a fourth aspect, a data card is provided, including a port form acquiring unit configured to acquire a port form flag from a data card switching apparatus; and a switching unit configured to switch, by the data card, to a corresponding port form according to the port form flag.

In a first possible implementation manner of the fourth aspect, the port form acquiring unit is configured to receive, after the data card is inserted into the data card switching apparatus or the data card is restarted, the port form flag sent by the data card switching apparatus, where the port form flag sent by the data card switching apparatus is obtained by running, on the data card switching apparatus, a driver of the corresponding port form.

In a second possible implementation manner of the fourth aspect, the port form acquiring unit is configured to read, after the data card is inserted into the data card switching apparatus or the data card is restarted, a port form flag stored in the data card, where when the data card is inserted into the data card switching apparatus, the port form flag stored in the data card is written to a memory of the data card by the data card switching apparatus by sending an AT command through an AT command port.

In a third possible implementation manner of the fourth aspect, the port form acquiring unit is configured to report, after the data card is inserted into the data card switching apparatus, an optical disc device, always keep an optical disc mode unchanged, and receive, using the optical disc mode, an optical disc command that is sent by the data card switching apparatus and includes the port form flag.

In a fourth possible implementation manner of the fourth aspect, the port form flag includes at least a modem port form flag or a hilink port form flag, and the data card includes at least a modem port form and a hilink port form.

In the embodiments of the present disclosure, a data card acquires a corresponding port form flag from a data card switching apparatus, and switches to a corresponding port form according to the port form flag, such that mode switching of the data card is performed without the need to upgrade data card software, thereby reducing maintenance costs of the data card.

BRIEF DESCRIPTION OF DRAWINGS

To describe the technical solutions in the embodiments of the present disclosure or in the prior art more clearly, the following briefly introduces the accompanying drawings required for describing the embodiments or the prior art. The accompanying drawings in the following description show some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some rather than all embodiments of the present disclosure. All other embodiments obtained by a person of ordinary skill in the art based on the embodiments of the present disclosure without creative efforts shall fall within the protection scope of the present disclosure.

The following further describes implementation manners of the present disclosure in detail with reference to the accompanying drawings and the embodiments. The following embodiments are used to describe the present disclosure, but are not used to limit the scope of the present disclosure.

Figure 3:
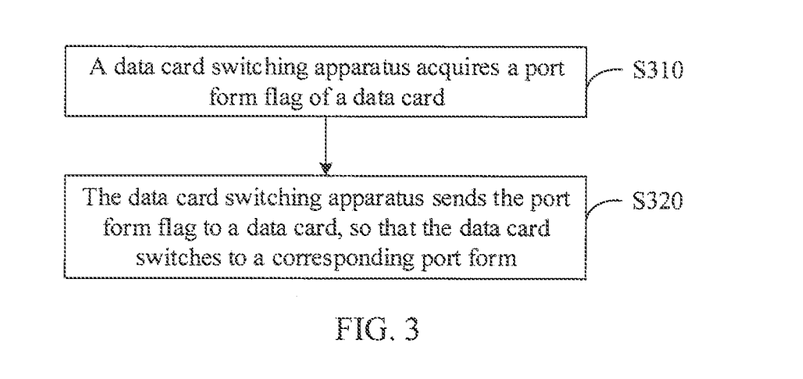
FIG. 3 is a flowchart of a data card switching method according to an embodiment of the present disclosure.

A first embodiment of the present disclosure provides a data card switching method, and as shown in FIG. 3, the method includes the following steps.

Step S310: A data card switching apparatus acquires a port form flag of a data card.

Step S320: The data card switching apparatus sends the port form flag to the data card, such that the data card switches to a corresponding port form. After the switching apparatus sends the port form flag to the data card, the data card first pulls down D+ (a data line with a universal serial bus (USB) interface), and informs the data card switching apparatus to reacquire a port form descriptor, so as to implement switching of the data card.

In this embodiment, step S310 that a data card switching apparatus acquires a port form flag of a data card includes the following three manners.

Manner 1: The data card switching apparatus obtains the port form flag by running a driver of a corresponding port form. For example, the data card switching apparatus is a computer, and when the data card is inserted into the computer, a drive letter of an optical disc appears on the computer, and a user may install, using the optical disc, a driver and an application program that are embedded in the data card. When an automatic operation function of the computer is enabled, the computer automatically installs a default port form driver of the optical disc. If the automatic operation function is not enabled, manual installation is performed by the user. After the default port form is installed, a Microsoft® Operation System (MSOS) descriptor of an operating system is modified to a corresponding port form flag. If another port form driver is installed on the computer, after the port form driver is installed, the MSOS descriptor of the operating system is modified to a corresponding port form flag. In this case, in step S320, after the data card is inserted into the data card switching apparatus or the data card is restarted, the data card switching apparatus sends the port form flag to the data card, that is, the computer sends the MSOS descriptor of the operating system to the data card.

Manner 2: The data card switching apparatus receives the port form flag set by a user. Step S320 is specifically that the data card switching apparatus enables an AT command port, and sends, using an AT command, the port form flag to the data card for storage, such that the data card reads the port form flag to implement switching.

Manner 3: The data card switching apparatus acquires the port form flag according to a pre-integrated configuration that is related to a port form flag. For example, the data card switching apparatus is a built-in device (generally, a driver or application program embedded in a data card cannot be installed on a built-in device, for example, a gateway, and therefore, a state of the data card cannot be switched using an embedded driver and program). Therefore, switching is performed on the inserted data card using the port form flag pre-configured in the built-in device. In step S320, when the data card is inserted into the data card switching apparatus, the data card switching apparatus sends, according to an optical disc device mode reported by the data card, the port form flag to the data card using an optical disc driver.

In this embodiment, the port form flag includes at least a modem port form flag or a hilink port form flag, and the data card includes at least a modem port form and a hilink port form.

Figure 4:
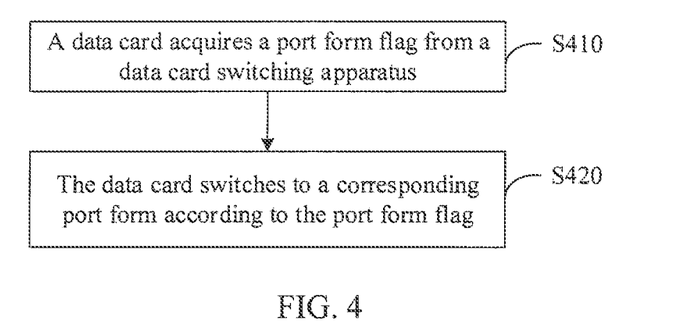
FIG. 4 is a flowchart of another data card switching method according to an embodiment of the present disclosure.

A second embodiment of the present disclosure provides another data card switching method, and as shown in FIG. 4, the method includes the following steps.

Step S410: A data card acquires a port form flag from a data card switching apparatus.

Step S420: The data card switches to a corresponding port form according to the port form flag.

In this embodiment, step S410 that a data card acquires a port form flag from a data card switching apparatus includes the following three manners.

Manner 1: The port form flag sent by the data card switching apparatus is received after the data card is inserted into the data card switching apparatus or the data card is restarted, where the port form flag sent by the data card switching apparatus is obtained by running, on the data card switching apparatus, a driver of the corresponding port form. For example, the data card switching apparatus is a computer, and when the data card is inserted into the computer, a drive letter of an optical disc appears on the computer, and a user may install, using the optical disc, a driver and an application program that are embedded in the data card. When an automatic operation function of the computer is enabled, the computer automatically installs a default port form driver of the optical disc. If the automatic operation function is not enabled, manual installation is performed by the user. After the default port form is installed, an MSOS descriptor of an operating system is modified to a corresponding port form flag. If another port form driver is installed on the computer, after the port form driver is installed, the MSOS descriptor of the operating system is modified to a corresponding port form flag. After the data card is inserted into the data card switching apparatus or the data card is restarted, the data card switching apparatus sends the port form flag to the data card, that is, the computer sends the MSOS descriptor of the operating system to the data card.

Manner 2: The port form flag stored in the data card is read after the data card is inserted into the data card switching apparatus or the data card is restarted, where when the data card is inserted into the data card switching apparatus, the port form flag stored in the data card is written to a memory of the data card by the data card switching apparatus by sending an AT command through an AT command port.

Manner 3: After the data card is inserted into the data card switching apparatus, the data card reports an optical disc device, keeps an optical disc mode unchanged, and receives, using the optical disc mode, an optical disc command that is sent by the data card switching apparatus and includes the port form flag.

In this embodiment, the port form flag includes at least a modem port form flag or a hilink port form flag, and the data card includes at least a modem port form and a hilink port form.

Figure 5:
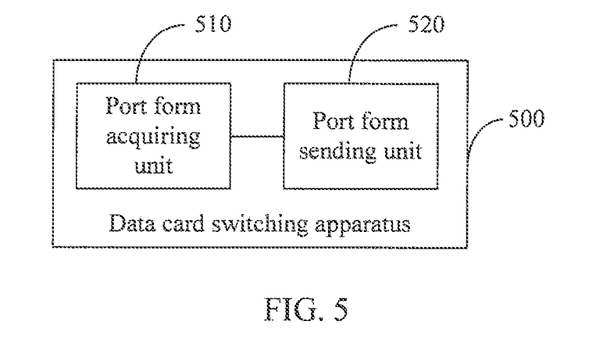
FIG. 5 is a schematic structural diagram of a data card switching apparatus according to an embodiment of the present disclosure.

A third embodiment of the present disclosure provides a data card switching apparatus 500, and as shown in FIG. 5, the apparatus includes a port form acquiring unit 510 configured to acquire a port form flag of a data card; and a port form sending unit 520 configured to send the port form flag to the data card, such that the data card switches to a corresponding port form.

In this embodiment, that the port form acquiring unit 510 acquires a port form flag of a data card includes the following three manners.

Manner 1: The port form acquiring unit 510 is configured to obtain the port form flag by running a driver of a corresponding port form. After the port form flag is acquired, the port form sending unit 520 is configured to send, after the data card is inserted into the data card switching apparatus or the data card is restarted, the port form flag to the data card.

Manner 2: The port form acquiring unit 510 is configured to receive the port form flag set by a user. After the port form flag is acquired, the port form sending unit 520 is configured to enable an AT command port, and send, using an AT command, the port form flag to the data card for storage, such that the data card reads the port form flag to implement switching.

Manner 3: The port form acquiring unit 510 is configured to acquire the port form flag according to a pre-integrated configuration that is related to a port form flag. After the port form flag is acquired, the port form sending unit 520 is configured to, when the data card is inserted into the data card switching apparatus, send, according to an optical disc device mode reported by the data card, the port form flag to the data card using an optical disc driver.

In this embodiment, the port form flag includes at least a modem port form flag or a hilink port form flag, and the data card includes at least a modem port form and a hilink port form.

Figure 6:
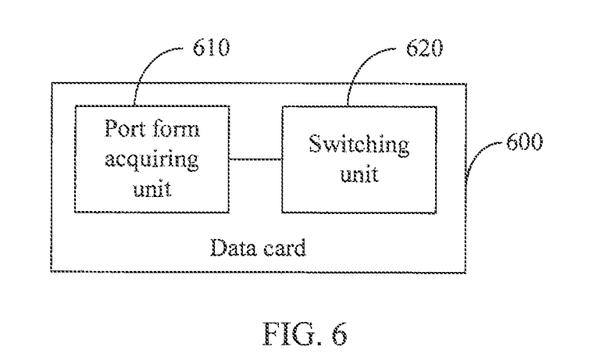
FIG. 6 is a schematic structural diagram of a data card according to an embodiment of the present disclosure.

A fourth embodiment of the present disclosure provides a data card 600, and as shown in FIG. 6, the data card includes a port form acquiring unit 610 configured to acquire a port form flag from a data card switching apparatus; and a switching unit 620 configured to switch, by the data card, to a corresponding port form according to the port form flag.

In this embodiment, the port form acquiring unit 610 of the data card acquires a port form flag includes the following three manners.

Manner 1: The port form acquiring unit 610 is configured to receive, after the data card is inserted into the data card switching apparatus or the data card is restarted, the port form flag sent by the data card switching apparatus, where the port form flag sent by the data card switching apparatus is obtained by running, on the data card switching apparatus, a driver of the corresponding port form.

Manner 2: The port form acquiring unit 610 is configured to read, after the data card is inserted into the data card switching apparatus or the data card is restarted, a port form flag stored in the data card, where when the data card is inserted into the data card switching apparatus, the port form flag stored in the data card is written to a memory of the data card by the data card switching apparatus by sending an AT command through an AT command port.

Manner 3: The port form acquiring unit 610 is configured to, after the data card is inserted into the data card switching apparatus, report an optical disc device, always keep an optical disc mode unchanged, and receive, using the optical disc mode, an optical disc command that is sent by the data card switching apparatus and includes the port form flag.

In this embodiment, the port form flag includes at least a modem port form flag or a hilink port form flag, and the data card includes at least a modem port form and a hilink port form.

The following describes the present disclosure using switching examples.

When a data card switching apparatus is a computer, switching may be performed using the following two manners.

Figure 7:
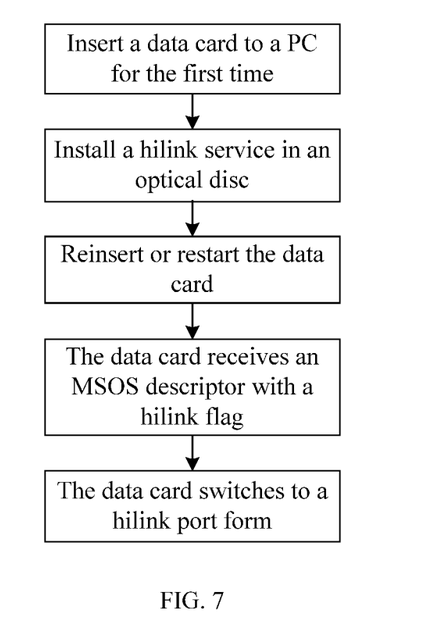
FIG. 7 is a flowchart of a data card switching method in which switching is implemented by running a data card driver according to an embodiment of the present disclosure, where a data card is initially set to a hilink port form by default.

Manner 1: A user uses a data card for the first time, where a default form is a hilink form, and as shown in FIG. 7, FIG. 7 is a flowchart of switching of a port form of a data card. When the data card is inserted into a computer of a user for the first time, a drive letter of an optical disc appears on the computer, and when an automatic operation function of the computer is enabled, the computer automatically installs a hilink service embedded in the optical disc. If the automatic operation function is not enabled, the user manually installs a hilink service. After the hilink service is installed, an MSOS descriptor of an operating system is modified to a hilink flag.

After a data card is reinserted or restarted, the data card receives an MSOS descriptor with the hilink flag, and the data card switches to a hilink form.

Figure 8:
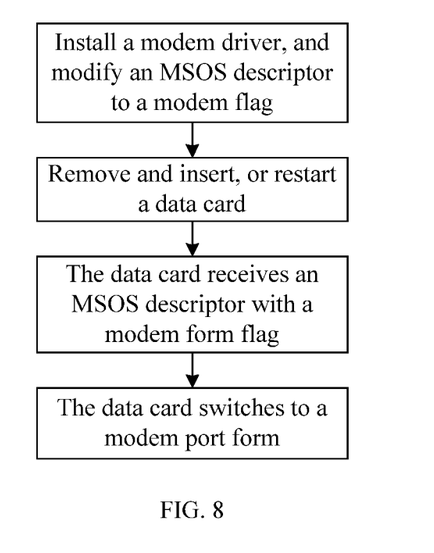
FIG. 8 is a flowchart of switching, in a process where switching is implemented by running a data card driver, from a hilink port form to a modem port form according to an embodiment of the present disclosure.

As shown in FIG. 8, a user installs a modem driver on a computer. After the installation is completed, the modem driver sets an MSOS descriptor to a modem flag.

After a data card is reinserted or restarted, the data card receives an MSOS descriptor with the modem flag, and the data card switches to a modem form.

Figure 9:
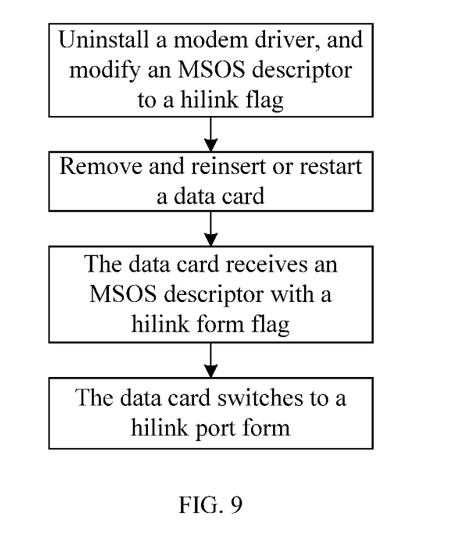
FIG. 9 is a flowchart of switching, in a process where switching is implemented by running a data card driver, from a modem port form back to a hilink port form according to an embodiment of the present disclosure.

As shown in FIG. 9, a user uninstalls a modem driver. An uninstall program first modifies an MSOS descriptor to a hilink flag, and then removes the modem driver from the PC.

After a data card is reinserted or restarted, the data card receives an MSOS descriptor with the hilink flag, and the data card switches to a hilink form.

Figure 10:
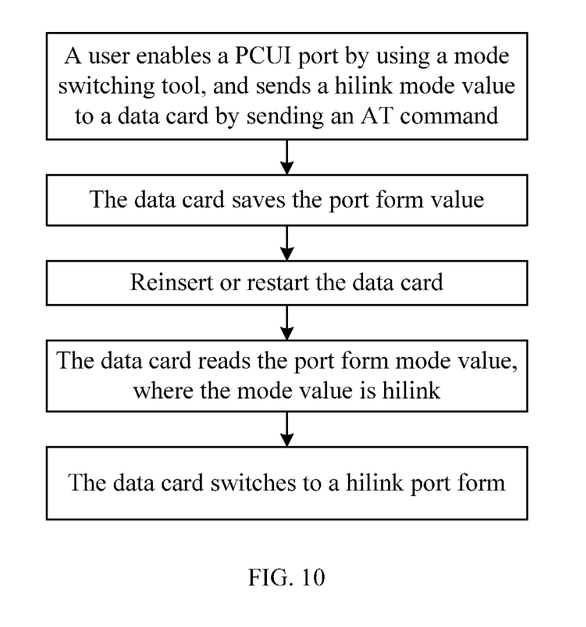
FIG. 10 is a flowchart of switching, in a process where switching is implemented using a mode switching tool, from a hilink port form to a modem port form according to an embodiment of the present disclosure.
Figure 11:
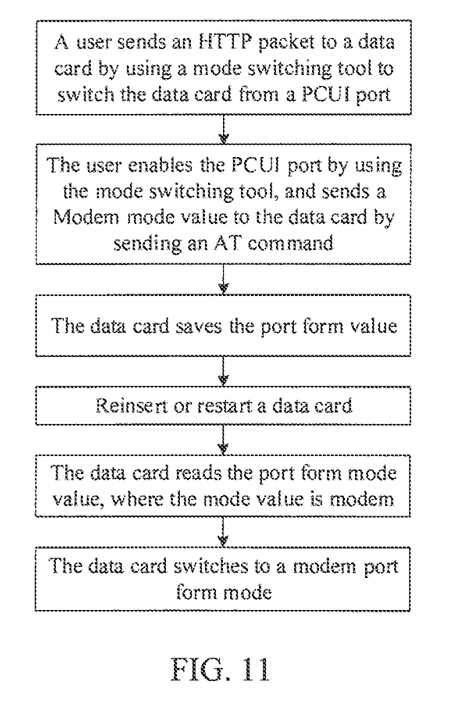
FIG. 11 is a flowchart of switching, in a process where switching is implemented using a mode switching tool, from a modem port form to a hilink port form according to an embodiment of the present disclosure.

Manner 2: In this solution, a mode switching tool (an application program embedded in a data card, which can provide a user interface, so as to acquire a port form flag set by a user) is used to send a port form flag of a data card to the data card for permanent storage. After being powered on, the data card reads the flag, and is automatically switched to a corresponding mode. For example, if a modem flag is read, the data card switches to a modem form; and if a hilink flag is read, the data card switches to a hilink mode, where the switching processes are shown in FIG. 10 and FIG. 11. FIG. 10 shows a process of switching from modem to hilink, and FIG. 11 shows a process of switching from hilink to modem. Because when in a hilink form, a data card works under a network adapter, and the data card needs to be switched to an AT command port, and then sends an AT command.

When a data card switching apparatus is a built-in device, switching may be performed using the following manner.

Figure 12:
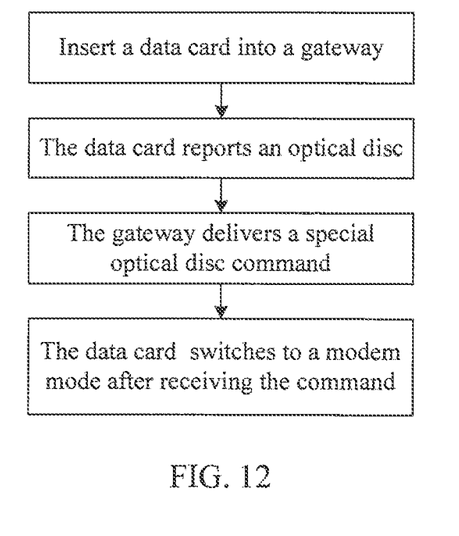
FIG. 12 is a flowchart of switching, in process where switching is implemented on a built-in device, from a hilink port form to a modem port form according to an embodiment of the present disclosure.

As shown in FIG. 12, in this solution, a special optical disc Small Computer System Interface (SCSI) command is directly delivered to a data card, such that the hilink data card inserted into the built-in device is directly switched to a modem mode. Generally, a driver or application program embedded in a data card cannot be installed on a built-in device, for example, a gateway, and therefore, a state of the data card cannot be switched using an embedded driver and application program. However, when the hilink data card is inserted into a gateway device, the data card reports an optical disc device, and keeps an optical disc mode unchanged. In this case, an optical disc driver integrated in the gateway may deliver a special optical disc command, such that the data card is automatically switched to a modem form. Finally, a dialer in the gateway dials through a modem port or a Network Driver Interface Specification (NDIS) port.

For a data card that has already been sold, the data card needs to be upgraded only once, and switching can be performed according to the foregoing manners once a driver and an application program that are of the data card are upgraded.

Figure 13:
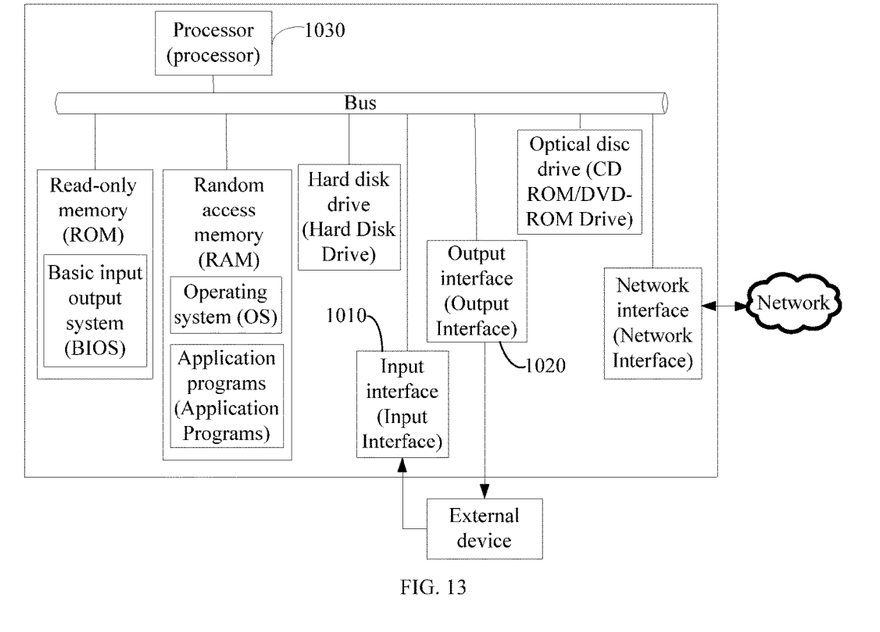
FIG. 13 is a schematic structural diagram of hardware of a data card switching apparatus according to the present disclosure.

As shown in FIG. 13, a data card switching apparatus according to the present disclosure is similar to an existing computer, and exchanges information with an external device (a data card) through an input interface 1010 and an output interface 1020. For example, when the data card is inserted into the data card switching apparatus, a default driver or application program of the data card is acquired through the input interface 1010, so as to acquire a port form flag of the data card. The output interface 1020 sends the acquired port form flag to the data card. The data card switching apparatus uses a processor 1030 to control the entire process of interaction with the data card.

A person of ordinary skill in the art may understand that, each aspect of the present disclosure or a possible implementation manner of each aspect may be implemented as a system, a method, or a computer program product. Therefore, each aspect of the present disclosure or a possible implementation manner of each aspect may use forms of hardware only embodiments, software only embodiments (including firmware, resident software, and the like), or embodiments with a combination of software and hardware, which are uniformly referred to as "circuit", "module", or "system" herein. In addition, each aspect of the present disclosure or a possible implementation manner of each aspect may take a form of a computer program product, where the computer program product refers to computer-readable program code stored in a computer-readable medium.

The computer-readable medium may be a computer-readable signal medium or a computer-readable storage medium. The computer-readable storage medium includes but is not limited to an electronic, magnetic, optical, electromagnetic, infrared, or semi-conductive system, device, or apparatus, or any appropriate combination thereof, such as a random access memory (RAM), a read-only memory (ROM), an erasable programmable read only memory (EPROM or flash memory), an optical fiber, and a compact disc read-only memory (CD-ROM).

A processor in a computer reads computer-readable program code stored in a computer-readable medium, so that the processor can perform a function and an action specified in each step or a combination of steps in a flowchart; and an apparatus is generated to implement a function and an action specified in each block or a combination of blocks in a block diagram.

All computer-readable program code may be executed on a user computer, or some may be executed on a user computer as a standalone software package, or some may be executed on a computer of a user and some may be executed on a remote computer, or all the code may be executed on a remote computer or a server. It should also be noted that, in some alternative implementation solutions, each step in the flowcharts or functions specified in each block in the block diagrams may not occur in the illustrated order. For example, dependent on related functions, two steps or two blocks illustrated consecutively may in fact be executed substantially at the same time, or these blocks may sometimes be executed in reverse order.

A person skilled in the art can make various modifications and variations to the present disclosure without departing from the spirit and scope of the present disclosure. The present disclosure is intended to cover these modifications and variations provided that they fall within the scope of protection defined by the following claims and their equivalents.

What is claimed is:

1. A data card switching method, comprising:
    installing, by a data card switching apparatus, a driver on the data card switching apparatus;
    setting, by the data card switching apparatus, an operating system descriptor to a flag after the driver is installed on the data card switching apparatus;
    acquiring, by the data card switching apparatus, the flag of a data card, wherein the flag is acquired by running the driver of a mode corresponding to the flag to obtain the flag; and
    sending, by the data card switching apparatus, the operating system descriptor with the flag to the data card, wherein the data card is configured to use the flag to switch to the corresponding mode, wherein the mode comprises a Remote Network Driver Interface Specification (RNDIS) mode, a modem mode, or a Hilink mode, and wherein the driver comprises an RNDIS driver, a modem driver, or a Hilink driver,
    wherein acquiring, by the data card switching apparatus, the flag of the data card comprises acquiring the flag of the data card according to a pre-integrated configuration that is related to the flag, and
    wherein sending, by the data card switching apparatus, the operating system descriptor with the flag to the data card comprises sending, by the data card switching apparatus according to an optical disc device mode reported by the data card, the flag to the data card using an optical disc driver when the data card is inserted into the data card switching apparatus.

2. The data card switching method according to claim 1, wherein sending, by the data card switching apparatus, the operating system descriptor with the flag to the data card comprises sending, by the data card switching apparatus, the operating system descriptor with the flag to the data card after the data card is inserted into the data card switching apparatus.

3. The data card switching method according to claim 1, wherein the method further comprises receiving, by the data card switching apparatus, another flag from a user.

4. The data card switching method according to claim 1, wherein sending, by the data card switching apparatus, the operating system descriptor with the flag to the data card comprises:
    enabling an attention (AT) command port; and
    sending, using an AT command, the flag to the data card for storage, wherein the data card is configured to read the flag to implement switching.

5. The data card switching method according to claim 1, wherein the flag comprises at least one of a modem flag and a Hilink flag, and wherein the data card comprises at least a modem mode and a Hilink mode.

6. The data card switching method according to claim 1, further comprising:
uninstalling, by the data card switching apparatus, the driver from the data card switching apparatus;
modifying, by the data card switching apparatus, the operating system descriptor to a different flag; and
sending, by the data card switching apparatus, the operating system descriptor with the different flag to the data card.

7. A data card switching apparatus, comprising:
a memory comprising instructions; and
a computer processor coupled to the memory, wherein the instructions cause the computer processor to be configured to:
install a driver on the data card switching apparatus;
set an operating system descriptor to a flag after the driver is installed on the data card switching apparatus;
acquire the flag of a data card, wherein the flag is acquired by running the driver of a mode corresponding to the flag to obtain the flag;
send the operating system descriptor with the flag to the data card, wherein the data card is configured to use the flag to switch to the corresponding mode, wherein the mode comprises a Remote Network Driver Interface Specification (RNDIS) mode, a modem mode, or a Hilink mode, and wherein the driver comprises an RNDIS driver, a modem driver, or a Hilink driver;
acquire the flag according to a pre-integrated configuration that is related to the flag; and
send, according to an optical disc device mode reported by the data card, the flag to the data card using an optical disc driver when the data card is inserted into the data card switching apparatus.

8. The data card switching apparatus according to claim 7, wherein the instructions further cause the computer processor to be configured to send the operating system descriptor with the flag to the data card after the data card is inserted into the data card switching apparatus.

9. The data card switching apparatus according to claim 7, wherein the instructions further cause the computer processor to be configured to receive another flag from a user.

10. The data card switching apparatus according to claim 7, wherein the instructions further cause the computer processor to be configured to:
enable an attention (AT) command port; and
send, using an AT command, the flag to the data card for storage, wherein the data card is configured to read the flag to implement switching.

11. A data card, comprising:
a memory comprising instructions; and
a computer processor coupled to the memory, wherein the instructions cause the computer processor to be configured to:
acquire an operating system descriptor with a flag from a data card switching apparatus, wherein the flag is acquired by running a driver of a mode corresponding to the flag to obtain the flag, and wherein the flag is obtained after the data card switching apparatus installs the driver;
switch, by the data card, to the corresponding mode according to the flag, wherein the mode comprises a Remote Network Driver Interface Specification (RNDIS) mode, a modem mode, or a Hilink mode, and wherein the driver comprises an RNDIS driver, a modem driver, or a Hilink driver;
acquire the flag according to a pre-integrated configuration that is related to the flag; and
send, according to an optical disc device mode reported by the data card, the flag to the data card using an optical disc driver when the data card is inserted into the data card switching apparatus.

12. The data card according to claim 11, wherein the instructions further cause the computer processor to be configured to read a flag stored in the data card after the data card is inserted into the data card switching apparatus, wherein the flag stored in the data card is written to a memory of the data card by the data card switching apparatus by sending an attention (AT) command through an AT command port when the data card is inserted into the data card switching apparatus.

13. The data card according to claim 11, wherein the instructions further cause the computer processor to be configured to:
report an optical disc device after the data card is inserted into the data card switching apparatus;
keep an optical disc mode unchanged; and
receive, using the optical disc mode, an optical disc command that is sent by the data card switching apparatus and comprises the flag.

* * * * *